(12) United States Patent
Gu et al.

(10) Patent No.: US 12,723,944 B2
(45) Date of Patent: Sep. 1, 2026

(54) DRAG TESTING APPARATUS WITH VARIABLE FLOW FIELD CURVATURES AND JET ANGLES

(71) Applicant: CHINA JILIANG UNIVERSITY, Hangzhou (CN)

(72) Inventors: Yunqing Gu, Hangzhou (CN); Jiegang Mou, Hangzhou (CN); Denghao Wu, Hangzhou (CN); Hongxin Ding, Hangzhou (CN); Jiayun Yu, Hangzhou (CN); Chaoxiang Hu, Hangzhou (CN); Qianfeng Qiu, Hangzhou (CN); Qiannan Lou, Hangzhou (CN); Youting Ding, Hangzhou (CN); Zhaozheng Wang, Hangzhou (CN)

(73) Assignee: CHINA JILIANG UNIVERSITY, Hangzhou (CN)

( * ) Notice: Subject to any disclaimer, the term of this patent is extended or adjusted under 35 U.S.C. 154(b) by 353 days.

(21) Appl. No.: 18/393,587

(22) Filed: Dec. 21, 2023

(65) Prior Publication Data

US 2024/0353288 A1 Oct. 24, 2024

(30) Foreign Application Priority Data

Apr. 23, 2023 (CN) ......................... 202310441418.5

(51) Int. Cl.
*G01M 10/00* (2006.01)
*G01M 9/06* (2006.01)

(52) U.S. Cl.
CPC .................................. *G01M 9/065* (2013.01)

(58) Field of Classification Search
CPC ......... G01M 9/065; G01M 9/04; G01M 10/00
USPC ........... 73/9, 147, 195, 196, 861.75, 861.87, 73/865.6, 865.8
See application file for complete search history.

(56) References Cited

FOREIGN PATENT DOCUMENTS

| | | | | |
|---|---|---|---|---|
| CN | 108844714 A | * 11/2018 | | G01M 10/00 |
| CN | 109115459 A | * 1/2019 | | G01M 10/00 |
| CN | 109556824 A | * 4/2019 | | G01M 10/00 |
| CN | 108982059 B | * 10/2023 | | G01M 10/00 |

* cited by examiner

*Primary Examiner* — Robert R Raevis
(74) *Attorney, Agent, or Firm* — METIS IP LLC

(57) ABSTRACT

Disclosed is a drag testing apparatus with variable flow field curvature and jet angle, comprising a main flow field supply device, a main flow field flow control device, a biomimetic circular test hose, a main flow field curvature adjustment device, a jet supply device, a jet flow control device, a multi-directional jet angle adjustment device, a pipe telescoping device, and a drag testing device. A liquid outlet of the main flow field supply device may be connected to a liquid inlet of the main flow field flow control device, a liquid outlet of the main flow field flow control device may be connected to a liquid inlet of the biomimetic circular test hose, a liquid outlet of the biomimetic circular test hose may be connected to a liquid inlet of the pipe telescoping device, and a liquid outlet of the pipe telescoping device may be connected to a water tank.

8 Claims, 11 Drawing Sheets

DRAG TESTING APPARATUS WITH VARIABLE FLOW FIELD CURVATURES AND JET ANGLES

CROSS-REFERENCE TO RELATED APPLICATIONS

This application claims priority to Chinese Application No. 202310441418.5, filed on Apr. 23, 2023, the contents of which are hereby incorporated by reference.

TECHNICAL FIELD

The present disclosure relates to the field of surface drag testing apparatus, and in particular, to a drag testing apparatus with variable flow field curvature and jet angle.

BACKGROUND

Biomimetic jet flow surface drag reduction technology is a rapidly emerging technology in the field of fluid drag reduction in recent years. The biomimetic jet flow surface drag reduction technology, a passive approach originating from biomimicry, is based on jet characteristics of shark gill surfaces. The biomimetic jet flow surface drag reduction technology is a novel and an efficient approach for drag reduction and energy savings, which may be applied to surfaces of waterborne or underwater vehicles with an aim of altering a near-wall boundary layer structure, thereby reducing wall drag.

Currently, most biomimetic jet flow surface drag reduction research focuses on the study of planar flow field domains. Limited research is provided for jet flow drag reduction in variable curvature flow field domains, or only numerical simulation approaches are employed for studying the variable curvature flow field domains. However, numerical simulations are mostly auxiliary manners, serving as supplements and refinements of experimental results. Due to different forms of structural discretization, obtained results and accuracy are also different, showing considerable randomness and lower credibility. In addition, current apparatus for adjusting a jet angle are mostly limited to adjusting an angle within a single plane, which cannot achieve a multi-directional jet angle adjustment, thereby, to some extent, restricting research on jet flow drag reduction.

Therefore, to address the above issues, it is desirable to provide an economical and simple method, and a drag testing apparatus capable of achieving variable flow field curvature and a multi-directional jet angle adjustment.

SUMMARY

Some embodiments of the present disclosure provide a drag testing apparatus with variable flow field curvature and jet angle. The drag testing apparatus may include a main flow field supply device, a main flow field flow control device, a biomimetic circular test hose, a main flow field curvature adjustment device, a jet supply device, a jet flow control device, a multi-directional jet angle adjustment device, a pipe telescoping device, and a drag testing device. A liquid outlet of the main flow field supply device may be connected to a liquid inlet of the main flow field flow control device, a liquid outlet of the main flow field flow control device may be connected to a liquid inlet of the biomimetic circular test hose, a liquid outlet of the biomimetic circular test hose may be connected to a liquid inlet of the pipe telescoping device, and a liquid outlet of the pipe telescoping device may be connected to a water tank. The biomimetic circular test hose may be provided inside the main flow field curvature adjustment device. A liquid outlet of the jet supply device may be connected to a liquid inlet of the jet flow control device, a liquid outlet of the jet flow control device may be connected to a liquid inlet of the multi-directional jet angle adjustment device, a liquid outlet of the multi-directional jet angle adjustment device may be connected to one or more jet hole inlets on the biomimetic circular test hose, and the multi-directional jet angle adjustment device may be installed on the main flow field curvature adjustment device. The liquid inlet and the liquid outlet of an inner wall of the biomimetic circular test hose may be respectively installed with the drag testing device. The multi-directional jet angle adjustment device may include a plurality of springs, a plurality of suspension rings, an upper cover plate, a sliding block, a threaded rod, a sliding block press plate, a threaded rod press plate, an internal threaded block, a base, a rotating outer ring, a conical roller bearing, and a fixed inner ring. A bottom circular convex platform of the base may be connected to the main flow field curvature adjustment device. The sliding block press plate, when assembled with the base, may form a sliding groove. The sliding block may be installed in the sliding groove and may be configured to slide along a circumferential direction. A center of the sliding block may be provided with a threaded through-hole. The threaded rod may be installed in the threaded through-hole of the sliding block through a threaded connection and may be configured to move along an axial direction by rotating the threaded rod. An outer convex platform of the rotating outer ring may be provided with a blind hole. A top of the threaded rod may be connected to the internal threaded block. The internal threaded block may be connected to the blind hole through the threaded rod press plate. A stepped hole may be provided inside the rotating outer ring. An outer side of the conical roller bearing may be assembled with an upper end hole of the rotating outer ring. The fixed inner ring may be in a stepped shaft shape with two sections, and a circular through-hole may be provided inside the fixed inner ring. A lower end shaft of the fixed inner ring may be assembled with an inner hole of the conical roller bearing to ensure that the fixed inner ring remains stationary when the rotating outer ring rotates through the conical roller bearing. A liquid inlet at an upper end of the circular through-hole of the fixed inner ring may be adhesively connected to the telescopic hose through waterproof sealing glue, and a liquid outlet at a lower end of the circular through-hole of the fixed inner ring may be adhesively connected to a jet telescopic hose through the waterproof sealing glue. An outer convex platform of the fixed inner ring may be provided with a plurality of threaded holes. Four of the plurality of suspension rings may be connected to the fixed inner ring through the plurality of threaded holes on the outer convex platform of the fixed inner ring and the four of the plurality of suspension rings may be installed on the fixed inner ring in a circular arrangement at intervals of 90°. An inner convex platform of the upper cover plate may also be provided with a plurality of threaded holes. Another four of the plurality of suspension rings may be connected to the upper cover plate through the plurality of threaded holes on the inner convex platform of the upper cover plate, and the another four of the plurality of suspension rings may be installed on the upper cover plate in a circular arrangement at intervals of 90°. The plurality of springs may be configured to connect the upper cover plate and the fixed inner ring through the four of the plurality of suspension rings installed on the upper cover plate and the another four of the plurality of suspension rings installed on the fixed inner ring, and the plurality of springs may be configured to support the fixed inner ring. The base may be connected to the upper cover plate. A position of the fixed inner ring may be changed by a sliding of the sliding block in the sliding groove along the circumferential direction and a movement of the threaded rod along the axial direction adjusted by a rotation of the threaded rod, such that the jet angle of the jet telescopic hose may be changed. Different jet angles may be formed in any direction through mutual coordination between the sliding block and the threaded rod.

BRIEF DESCRIPTION OF THE DRAWINGS

The present disclosure is further illustrated by way of exemplary embodiments, which is described in detail through the accompanying drawings. These embodiments are not limiting, and in these embodiments, a same numbering indicates a same structure, wherein.

Figure 1:
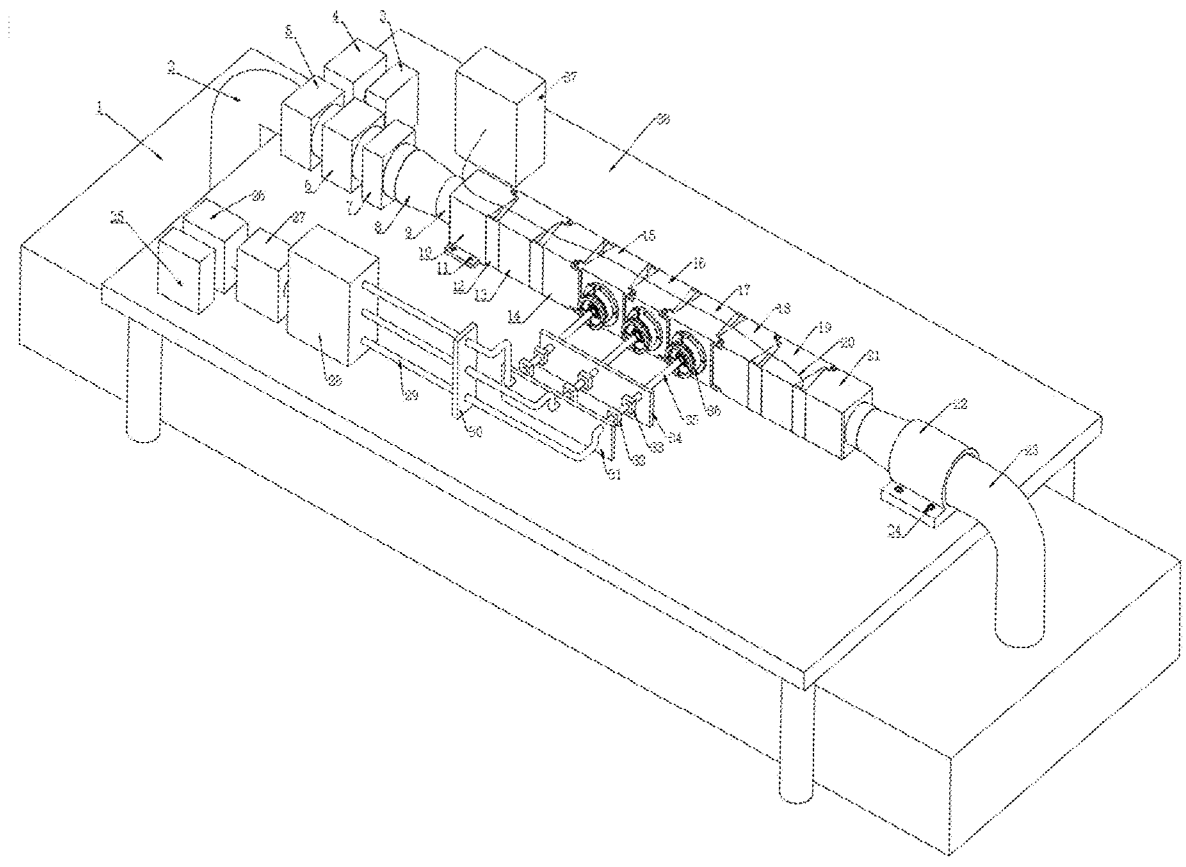
FIG. 1 is a schematic diagram of a structure of a drag testing apparatus according to some embodiments of the present disclosure.

IN THE DRAWINGS water tank 1, main flow inlet pipe 2, main flow frequency converter 3, main flow motor 4, main flow pump 5, main flow electric ball valve 6, main flow flowmeter 7, rectifying pipe 8, biomimetic circular test hose 9, first fixed segment 10, inner hexagonal screw 11, ion-exchange polymer metal composite (IPMC) telescopic plate 12, first trapezoidal segment 13, first parallelogram segment 14, first inverted trapezoidal segment 15, second inverted trapezoidal segment 16, third inverted trapezoidal segment 17, second parallelogram segment 18, second trapezoidal segment 19, control signal line 20, first end segment 21, pipe telescoping device 22, main flow outlet pipe 23, inner hexagonal screw 24, jet frequency converter 25, jet motor 26, jet pump 27, jet water tank 28, jet pipe 29, first support plate 30, second support plate 31, jet electric ball valve 32, jet flowmeter 33, third support plate 34, telescopic hose 35, multi-directional jet angle adjustment device 36, control console 37, experimental platform 38, jet telescopic hose 39, universal wheel 40, drag testing device 41, Hall sensor 41-1, turntable bracket 41-2, turntable 41-3, magnet 41-4, movable pipe 42, spring 36-1, suspension ring 36-2, upper cover plate 36-3, sliding block 36-4, threaded rod 36-5, sliding block press plate 36-6, threaded rod press plate 36-7, internal threaded block 36-8, base 36-9, rotating outer ring 36-10, conical roller bearing 36-11, fixed inner ring 36-12, tubular body 43, hinge member 44, incision groove 45.

DETAILED DESCRIPTION

In order to more clearly illustrate the technical solutions of the embodiments of the present disclosure, the accompanying drawings for the description of the embodiments are described below. Obviously, the accompanying drawings in the following description are only some examples or embodiments of the present disclosure, and it is possible for a person of ordinary skill in the art to apply the present disclosure to other similar scenarios in accordance with these accompanying drawings without creative labor. Unless obviously obtained from the context or the context illustrates otherwise, the same numeral in the drawings refers to the same structure or operation.

It should be understood that the terms "system," "device," "unit," and/or "module" are used herein as a way to distinguish between different components, elements, parts, sections, or assemblies at different levels. However, if other words may achieve the same purpose, the terms may be replaced with alternative expressions.

As indicated in the present disclosure and in the claims, unless the context clearly suggests an exception, the words "one," "a," "a kind of," and/or "the" do not refer specifically to the singular but may also include the plural. In general, the terms "include" and "comprise" suggest only the inclusion of clearly identified steps and elements, which do not constitute an exclusive list, and the method or device may also include other steps or elements.

FIG. 1 is a schematic diagram of a structure of a drag testing apparatus according to some embodiments of the present disclosure.

In some embodiments, as illustrated in FIG. 1, the drag testing apparatus with variable flow field curvature and jet angle may include a main flow field supply device, a main flow field flow control device, a biomimetic circular test hose 9, a main flow field curvature adjustment device, a jet supply device, a jet flow control device, a multi-directional jet angle adjustment device, a pipe telescoping device 22, a drag testing device 41, and an experimental platform 38.

In some embodiments, the main flow field supply device, the main flow field flow control device, the biomimetic circular test hose 9, the main flow field curvature adjustment device, the jet supply device, the jet flow control device, the multi-directional jet angle adjustment device, the pipe telescoping device 22, and the drag testing device 41 may be placed on the experimental platform 38.

In some embodiments, a liquid outlet of the main flow field supply device may be connected to a liquid inlet of the main flow field flow control device, and a liquid outlet of the main flow field flow control device may be connected to a liquid inlet of the biomimetic circular test hose. In some embodiments, a liquid outlet of the biomimetic circular test hose 9 may be connected to a liquid inlet of the pipe telescoping device 22, and a liquid outlet of the pipe telescoping device 22 may be connected to a water tank 1.

In some embodiments, the biomimetic circular test hose 9 may be fixed inside the main flow field curvature adjustment device.

In some embodiments, a liquid outlet of the jet supply device may be connected to a liquid inlet of the jet flow control device, a liquid outlet of the jet flow control device may be connected to a liquid inlet of the multi-directional jet angle adjustment device, and a liquid outlet of the multi-directional jet angle adjustment device may be connected to one or more jet hole inlets on the biomimetic circular test hose 9.

In some embodiments, the multi-directional jet angle adjustment device may be installed on the main flow field curvature adjustment device through various connection manners (e.g., through a screw, a buckle, etc.). In some embodiments, the pipe telescoping device 22 may be fixed on the experimental platform 38 through various connection manners. In some embodiments, the liquid inlet and the liquid outlet on an inner wall of the biomimetic circular test hose 9 may be respectively provided with the drag testing device 41 through a connection manner such as a threaded connection, a buckle connection, a welding connection, etc.

The main flow field supply device is a device configured to generate a main flow field. In some embodiments, as shown in FIG. 1, the main flow field supply device may include the water tank 1, a main flow inlet pipe 2, a main flow frequency converter 3, a main flow motor 4, and a main flow pump 5. The main flow frequency converter 3 may be used to control a rotation speed of the main flow motor 4 by frequency modulation, and a power output end of the main flow motor 4 may be connected to a power input end of the main flow pump 5 through a coupling. A liquid inlet of the main flow pump 5 may be connected to the water tank 1 through the main flow inlet pipe 2, and a liquid outlet of the main flow pump 5 may be connected to a liquid inlet of the main flow field flow control device through an outlet pipe. In some embodiments, by adjusting the rotation speed of the main flow motor 4 through the main flow frequency converter 3, the main flow motor 4 may drive the main flow pump 5 to operate, thereby pumping water from the water tank 1 into the biomimetic circular test hose 9 through the outlet pipe.

The main flow field flow control device is a device configured to regulate water flow in the main flow field. In some embodiments, as illustrated in FIG. 1, the main flow field flow control device includes a main electric ball valve 6, a main flow meter 7, a first water pipe, and a second water pipe. A liquid inlet of the main electric ball valve 6 is in a sealing connection to the liquid outlet of the main flow pump 5 through the first water pipe, and a liquid inlet of the main flow meter 7 is in a sealing connection to a liquid outlet of the main electric ball valve 6 through the second water pipe. In some embodiments, the main electric ball valve 6 may be configured to control a magnitude of the flow, and the main flow meter 7 may be configured to monitor the fluid supply flow in a system, thereby achieving the function of adjusting a main flow velocity.

The jet supply device is a device configured to generate a jet. In some embodiments, as illustrated in FIG. 1, the jet supply device includes a jet frequency converter 25, a jet motor 26, a jet pump 27, and a jet water tank 28. The jet frequency converter 25 may control a rotation speed of the jet motor 26 by frequency modulation, and a power output end of the jet motor 26 may be connected to a power input end of the jet pump 27 through a coupling. A liquid inlet of the jet pump 27 may be connected to the water tank 1, and a liquid outlet of the jet pump 27 may be connected to the jet water tank 28 through an outlet pipe. In some embodiments, by adjusting the rotation speed of the jet motor 26 through the jet frequency converter 25, the jet motor 26 may drive the jet pump 27 to operate, thereby pumping water from the water tank 1 into the jet water tank 28 through the outlet pipe.

The jet flow control device is a device configured to regulate jet flow. In some embodiments, as illustrated in FIG. 1, the jet flow control device may include a jet pipe 29, a first support plate 30, a second support plate 31, a third support plate 34, a jet electric ball valve 32, and a jet flowmeter 33. A liquid inlet of the jet electric ball valve 32 is in a sealing connection to a liquid outlet of the jet water tank 28 through the jet pipe 29, and a liquid outlet of the jet electric ball valve 32 is in a sealing connection to a liquid inlet of the jet flowmeter 33. A liquid outlet of the jet flowmeter 33 is in a sealing connection to a liquid inlet of a telescopic hose 35. In some embodiments, the first support plate 30, the second support plate 31, and the third support plate 34 may be fixed on the experimental platform 38 in various ways (e.g., through a screw) and may be used to support a pipeline. In some embodiments, the jet electric ball valve 32 may be used to control a magnitude of the jet flow, and the jet flowmeter 33 may be used to monitor the fluid supply flow in the system, thereby achieving the function of adjusting a jet velocity.

Figure 2:
FIG. 2 is a top view of a main flow field curvature adjustment device assembled with a biomimetic circular test hose according to some embodiments of the present disclosure.
Figure 2:
Figure 2:
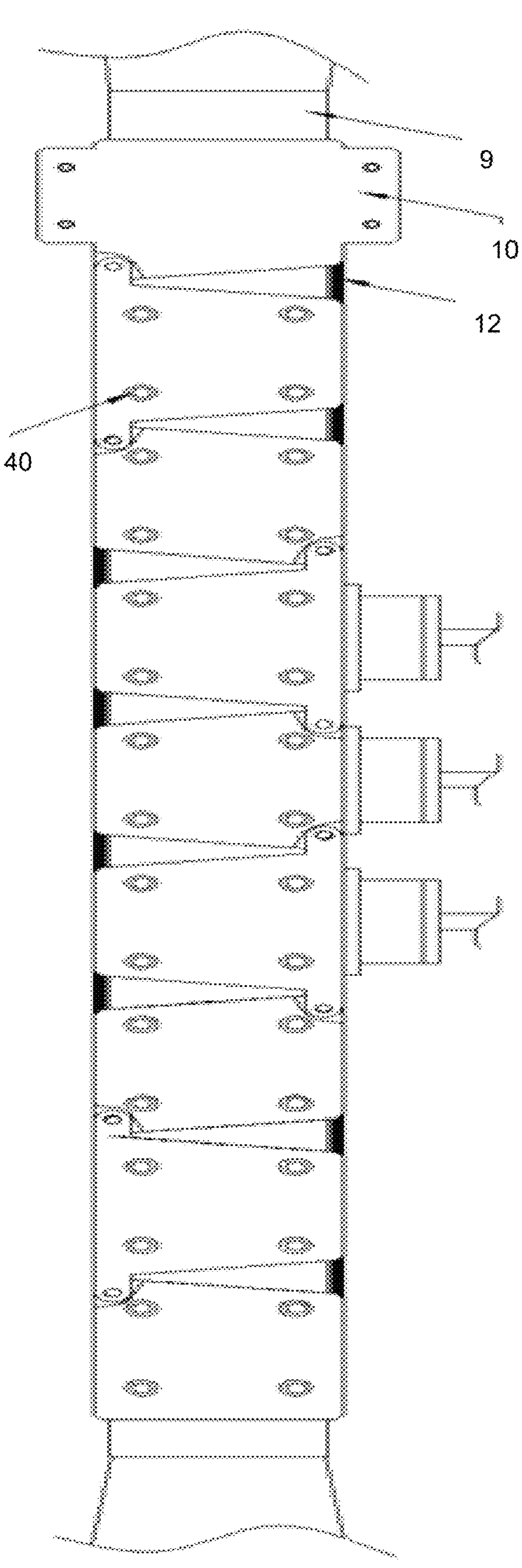
Figure 3:
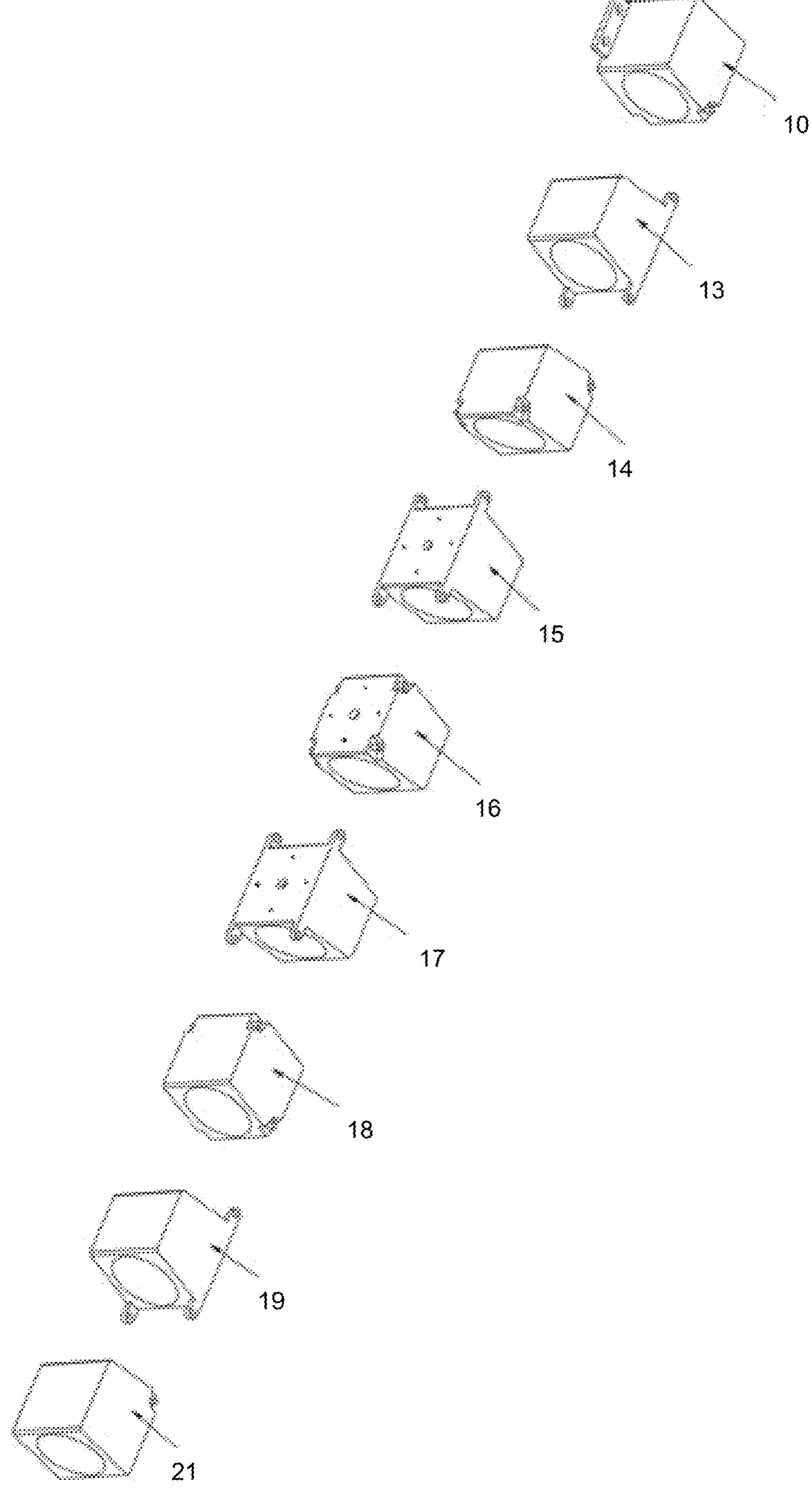
FIG. 3 is a schematic diagram of a structure of each segment of a main flow field curvature adjustment device according to some embodiments of the present disclosure.
Figure 4:
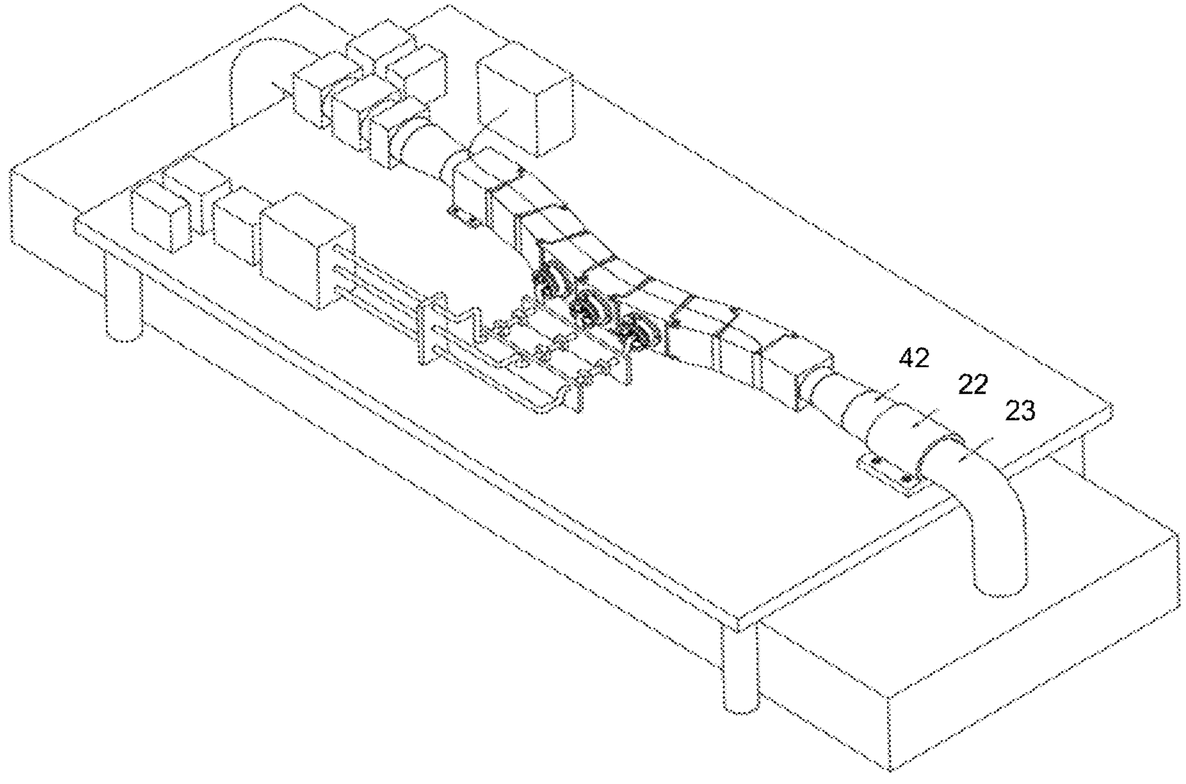
FIG. 4 is a schematic diagram of a structure of a drag testing apparatus after a main flow field curvature changes according to some embodiments of the present disclosure.

FIG. 2 is a top view of a main flow field curvature adjustment device assembled with a biomimetic circular test hose according to some embodiments of the present disclosure; FIG. 3 is a schematic diagram of a structure of each segment of a main flow field curvature adjustment device according to some embodiments of the present disclosure; FIG. 4 is a schematic diagram of a structure of a drag testing apparatus after a main flow field curvature changes according to some embodiments of the present disclosure; and FIG. 5 is a schematic diagram of a structure of a multi-directional jet angle adjustment device according to some embodiments of the present disclosure.

Figure 5:
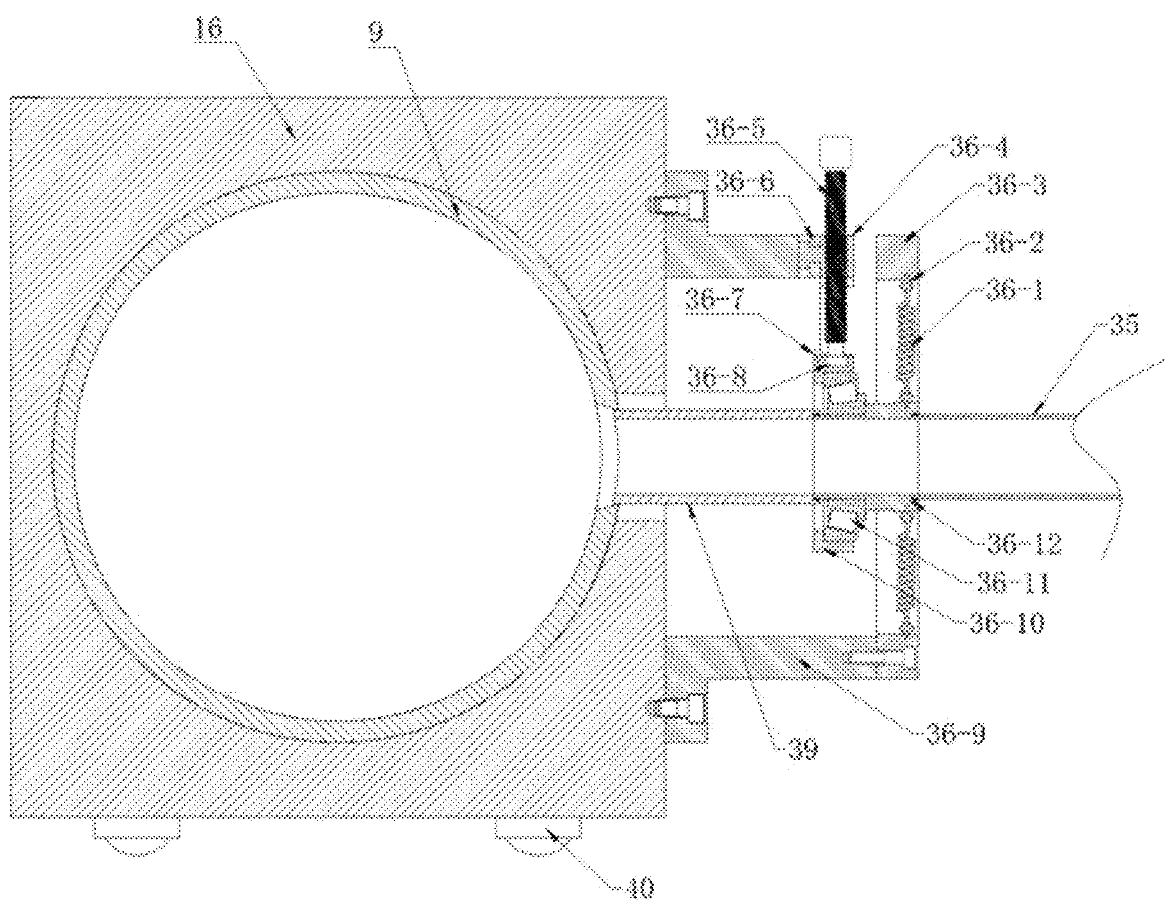
FIG. 5 is a schematic diagram of a structure of a multi-directional jet angle adjustment device according to some embodiments of the present disclosure.

In some embodiments, as illustrated in FIGS. 1, 4, and 5, a liquid inlet of the biomimetic circular test hose 9 may be connected to a liquid outlet of the main flow meter 7 through a rectifying pipe 8. In some embodiments, the rectifying pipe 8 may act as a rectifier, improving the quality of a flow field. After acceleration in a contraction section, liquid is pumped into the biomimetic circular test hose 9.

In some embodiments, the liquid outlet of the biomimetic circular test hose 9 may be connected to a liquid inlet of a movable pipe 42. A surface of the biomimetic circular test hose 9 may be uniformly distributed with three jet hole inlets, and each of the three jet hole inlets may be connected to a liquid outlet of the jet telescopic hose 39 through waterproof sealing glue. More details about the movable pipe 42 may be found in the following related descriptions in the present disclosure.

The main flow field curvature adjustment device is a device configured to adjust the curvature of the main flow field. In some embodiments, as illustrated in FIGS. 1, 2, 3, and 4, the main flow field curvature adjustment device includes a first fixed segment 10, a first trapezoidal segment 13, a first parallelogram segment 14, a first inverted trapezoidal segment 15, a second inverted trapezoidal segment 16, a third inverted trapezoidal segment 17, a second parallelogram segment 18, a second trapezoidal segment 19, a first end segment 21, a plurality of ion-exchange polymer metal composite (IPMC) telescopic plates 12, a control signal line 20, a control console 37, and a plurality of universal wheels 40.

In some embodiments, a lower end of the first fixed segment 10 may be fixed on the experimental platform 38 in various ways. For example, the lower end of the first fixed segment 10 may be fixed on the experimental platform 38 by an inner hexagonal screw 11. An upper right corner of the first fixed segment 10 may be hingedly connected to an upper left corner of the first trapezoidal segment 13. An upper right corner of the first trapezoidal segment 13 may be hingedly connected to an upper left corner of the first parallelogram segment 14. A lower right corner of the first parallelogram segment 14 may be hingedly connected to a lower left corner of the first inverted trapezoidal segment 15. A lower right corner of the first inverted trapezoidal segment 15 may be hingedly connected to a lower left corner of the second inverted trapezoidal segment 16. A lower right corner of the second inverted trapezoidal segment 16 may be hingedly connected to a lower left corner of the third inverted trapezoidal segment 17. A lower right corner of the third inverted trapezoidal segment 17 may be hingedly connected to a lower left corner of the second parallelogram segment 18. An upper right corner of the second parallelogram segment 18 may be hingedly connected to an upper left corner of the second trapezoidal segment 19. An upper right corner of the second trapezoidal segment 19 may be hingedly connected to an upper left corner of the first end segment 21, eventually forming a shape similar to a "spine". In some embodiments, a relative rotation between each two segments may be ensured through the hinged connections, and a certain angle may exist between the each two segments. In some embodiments, a center of each segment is provided with a circular through-hole, and the biomimetic circular test hose is securely fixed through the circular through-hole of the each segment. After the main flow field curvature adjustment device is assembled, the biomimetic circular test hose 9 may be securely fixed through the circular through-hole of the each segment.

In some embodiments, the plurality of universal wheels 40 may be installed at bottoms of the first fixed segment, the first trapezoidal segment, the first parallelogram segment, the first inverted trapezoidal segment, the second inverted trapezoidal segment, the third inverted trapezoidal segment, the second parallelogram segment, the second trapezoidal segment, and the first end segment in various ways (e.g., through a threaded connection, a welding connection, etc.). In some embodiments, by installing the universal wheels 40 at the bottom of each segment, smooth movement of the each segment of the drag testing apparatus may be ensured when the drag testing apparatus is in motion.

In some embodiments, each of the plurality of IPMC telescopic plates 12 may be connected to a control signal line 20, and all control signal lines 20 may be configured to be connected to the control console 37. In some embodiments, the control console 37 may be configured to send a voltage signal to the plurality of IPMC telescopic plates 12 through the control signal lines 20. The plurality of IPMC telescopic plates 12 may be configured to undergo synchronized displacement deformation based on the voltage signal, such that the entire main flow field curvature adjustment device may be driven to change. In some embodiments, as the biomimetic circular test hose 9 is fixed within the main flow field curvature adjustment device, the biomimetic circular test hose may be driven to be bent synchronously, and a variation in curvature of the main flow field may be achieved based on a strength of the voltage signal emitted by the control console.

In some embodiments, the plurality of IPMC telescopic plates 12 may be made of IPMC (Ion-exchange Polymer Metal Composite) material. IPMC, as a type of smart material in artificial muscles, has advantages such as low driving voltage, fast response speed, light weight, and good flexibility. The IPMC material may produce significant displacement deformation at a relatively low voltage. When a voltage is applied to the plurality of IPMC telescopic plates 12 made of the IPMC material, the IPMC telescopic plates may undergo significant deformation. In some embodiments, the plurality of IPMC telescopic plates 12 may be adhesively bonded with epoxy resin in an angle between each two segments of the drag testing apparatus, enabling the plurality of IPMC telescopic plates 12 to undergo synchronized displacement deformation based on the voltage signal, such that the entire main flow field curvature adjustment device may be driven to change.

Figure 6:
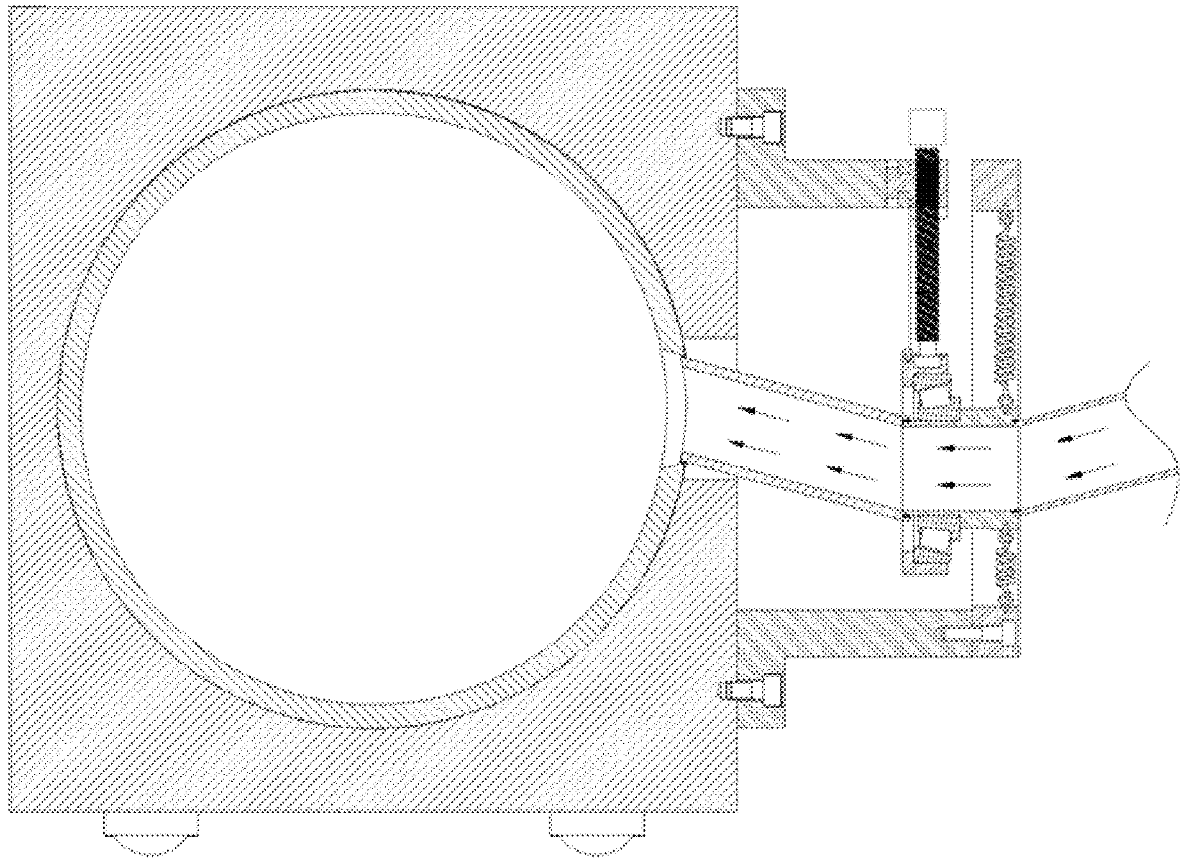
FIG. 6 is a sectional view of a multi-directional jet angle adjustment device after a jet angle changes according to some embodiments of the present disclosure.
Figure 7:
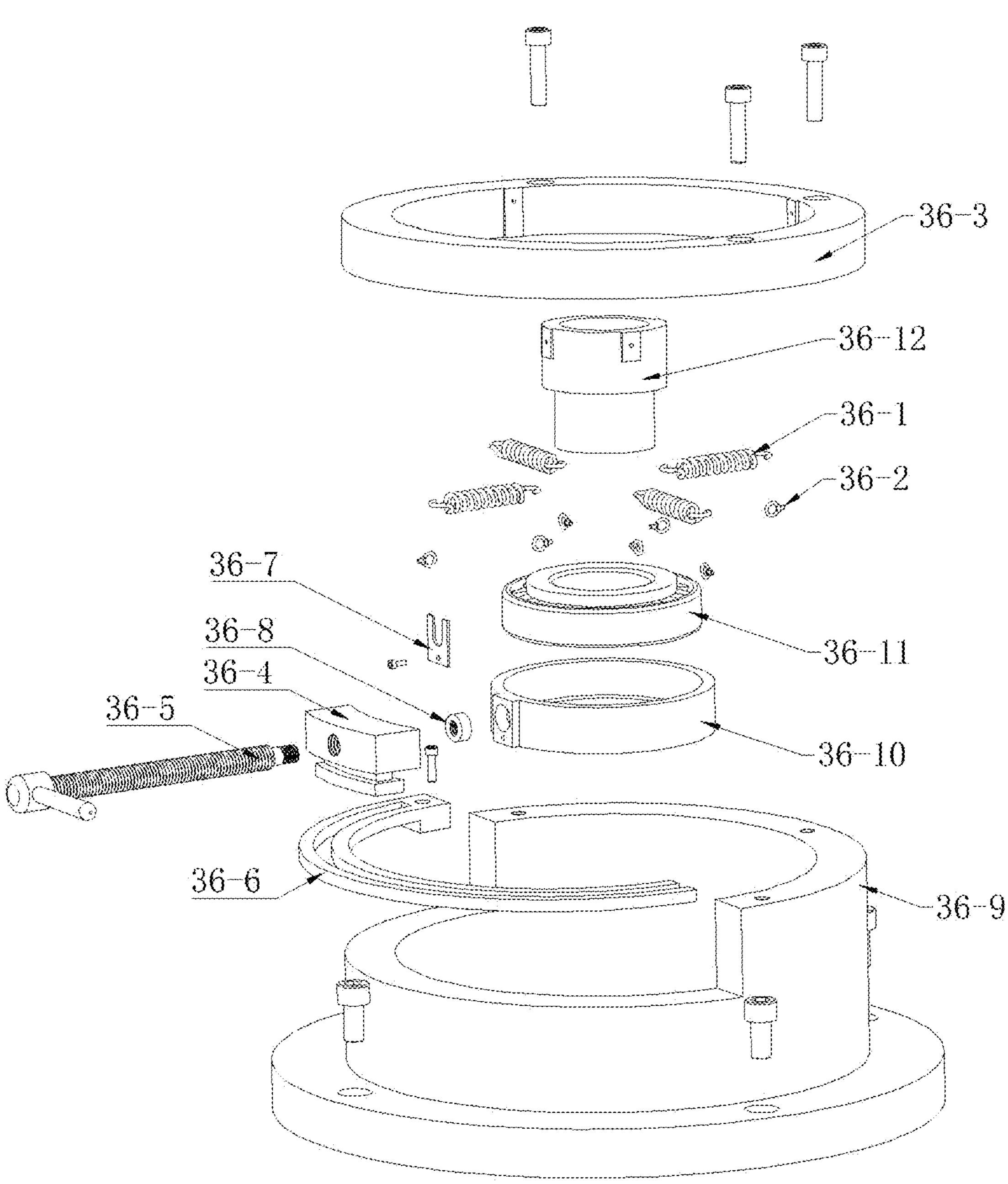
FIG. 7 is an exploded view of a multi-directional jet angle adjustment device according to some embodiments of the present disclosure.
Figure 8:
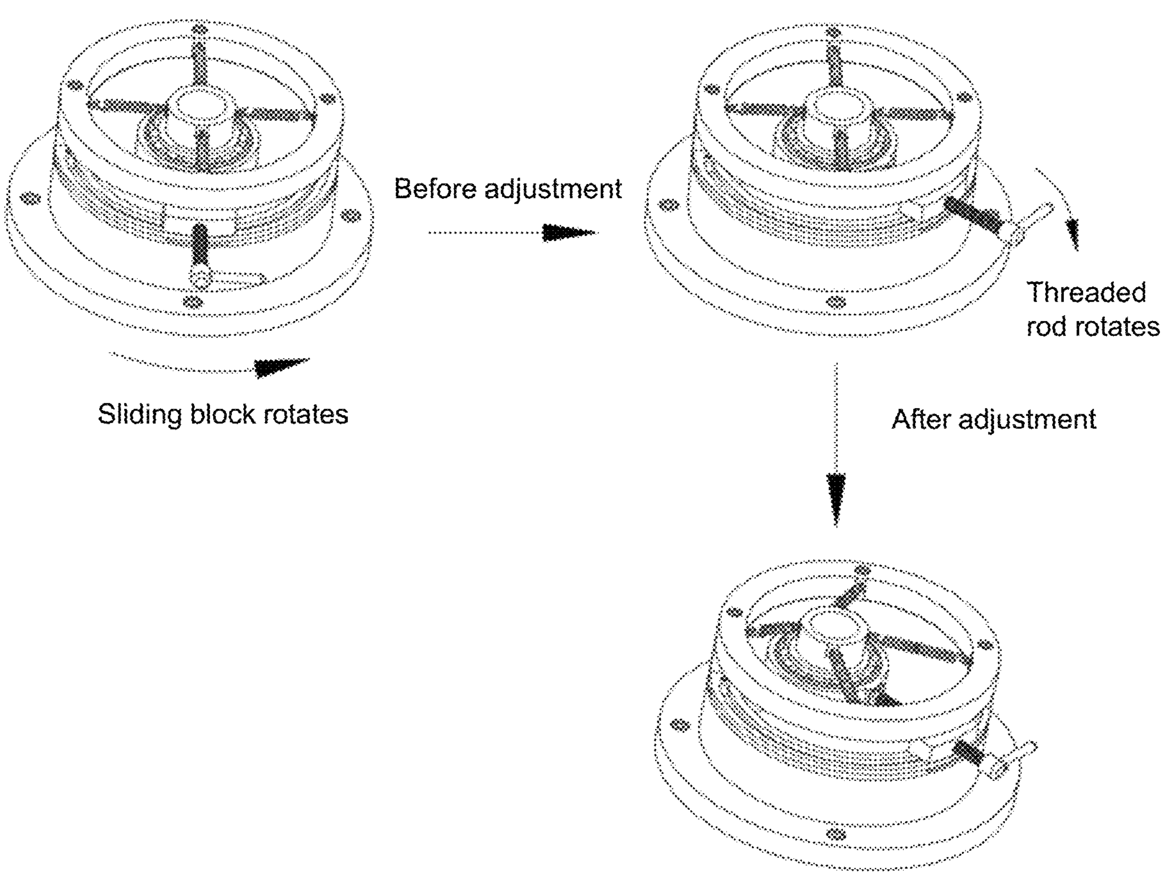
FIG. 8 is an axonometric comparison diagram of a changing process of a multi-directional jet angle according to some embodiments of the present disclosure.

FIG. 6 is a sectional view of a multi-directional jet angle adjustment device after a jet angle changes according to some embodiments of the present disclosure; FIG. 7 is an exploded view of a multi-directional jet angle adjustment device according to some embodiments of the present disclosure; and FIG. 8 is an axonometric comparison diagram of a changing process of a multi-directional jet angle according to some embodiments of the present disclosure.

The multi-directional jet angle adjustment device is a device configured to adjust the jet angle. In some embodiments, as illustrated in FIGS. 5-8, the multi-directional jet angle adjustment device includes a plurality of springs 36-1, a plurality of suspension rings 36-2, an upper cover plate 36-3, a sliding block 36-4, a threaded rod 36-5, a sliding block press plate 36-6, a threaded rod press plate 36-7, an internal threaded block 36-8, a base 36-9, a rotating outer ring 36-10, a conical roller bearing 36-11, and a fixed inner ring 36-12.

In some embodiments, a bottom circular convex platform of the base 36-9 may be connected to the main flow field curvature adjustment device through various types of connectors, such as an inner hexagonal screw. For example, the bottom circular convex platform of the base 36-9 may be connected to the main flow field curvature adjustment device by four inner hexagonal screws. In some embodiments, the sliding block press plate 36-6, when assembled with the base 36-9 through the inner hexagonal screws, may form a sliding groove, and the sliding block 36-4 may be installed in the sliding groove and configured to slide along a circumferential direction.

In some embodiments, a center of the sliding block 36-4 may be provided with a threaded through-hole, and the threaded rod 36-5 may be installed in the threaded through-hole of the sliding block through a threaded connection and configured to move along an axial direction by rotating the threaded rod 36-5.

In some embodiments, an outer convex platform of the rotating outer ring 36-10 may be provided with a blind hole. A top of the threaded rod 36-5 may be connected to the internal threaded block 36-8. After the top of the threaded rod 36-5 is connected to the internal threaded block 36-8, the internal threaded block 36-8 may be connected to the blind hole through the threaded rod press plate 36-7, which ensures that the threaded rod 36-5 may not affect the rotation of the outer ring 36-10 during rotation. In some embodiments, a stepped hole may be provided inside the rotating outer ring 36-10. An outer side of the conical roller bearing 36-11 may be assembled with an upper end hole of the rotating outer ring 36-10, the fixed inner ring 36-12 may be in a stepped shaft shape with two sections, and a circular through-hole may be provided inside the fixed inner ring 36-12. A lower end shaft of the fixed inner ring 36-12 may be assembled with an inner hole of the conical roller bearing 36-11 to ensure that the fixed inner ring 36-12 remains stationary when the rotating outer ring 36-10 rotates through the conical roller bearing. In some embodiments, a liquid inlet at an upper end of the circular through-hole of the fixed inner ring 36-12 may be adhesively connected to the telescopic hose 35 through waterproof sealing glue, and a liquid outlet at a lower end of the circular through-hole of the fixed inner ring 36-12 may be adhesively connected to the jet telescopic hose 39 through the waterproof sealing glue. In some embodiments, an outer convex platform of the fixed inner ring 36-12 may be provided with a plurality of threaded holes. Four of the plurality of suspension rings 36-2 may be connected to the fixed inner ring 36-12 through the plurality of threaded holes on the fixed inner ring 36-12, and the four of the plurality of suspension rings 36-2 may be installed in a circular arrangement at intervals of 90°. In some embodiments, the inner side convex platform of the upper cover plate 36-3 may also has be provided with a plurality of threaded holes. Another four of the plurality of suspension ring 36-2 may be connected to the upper cover plate 36-3 through the plurality of threaded holes on the upper cover plate 36-3, and the another four of the plurality of suspension rings 36-2 may be installed in a circular arrangement at intervals of 90°.

In some embodiments, the plurality of springs 36-1 may be configured to connect the upper cover plate and the fixed inner ring through the four of the plurality of suspension rings 36-2 installed on the upper cover plate 36-3 and the another four of the plurality of suspension rings 36-2 installed on the fixed inner ring 36-12. The plurality of springs mainly be configured to support the fixed inner ring 36-12. In some embodiments, the base 36-9 and the upper cover plate 36-3 may be connected in various ways. For example, the base 36-9 may be connected to the upper cover plate 36-3 by an inner hexagonal screw. In some embodiments, a position of the fixed inner ring 36-12 may be changed by a sliding of the sliding block 36-4 in the sliding groove along the circumferential direction and a movement of the threaded rod along the axial direction adjusted by a rotation of the threaded rod 36-5. In some embodiments, a liquid outlet at the lower end of the circular through-hole of the fixed inner ring 36-12 may be connected to the jet telescopic hose 39 through waterproof sealing glue, such that the jet angle of the jet telescopic hose 39 may be changed. In some embodiments, different jet angles may be formed in any direction through mutual coordination between the sliding block 36-4 and the threaded rod 36-5.

Figure 9:
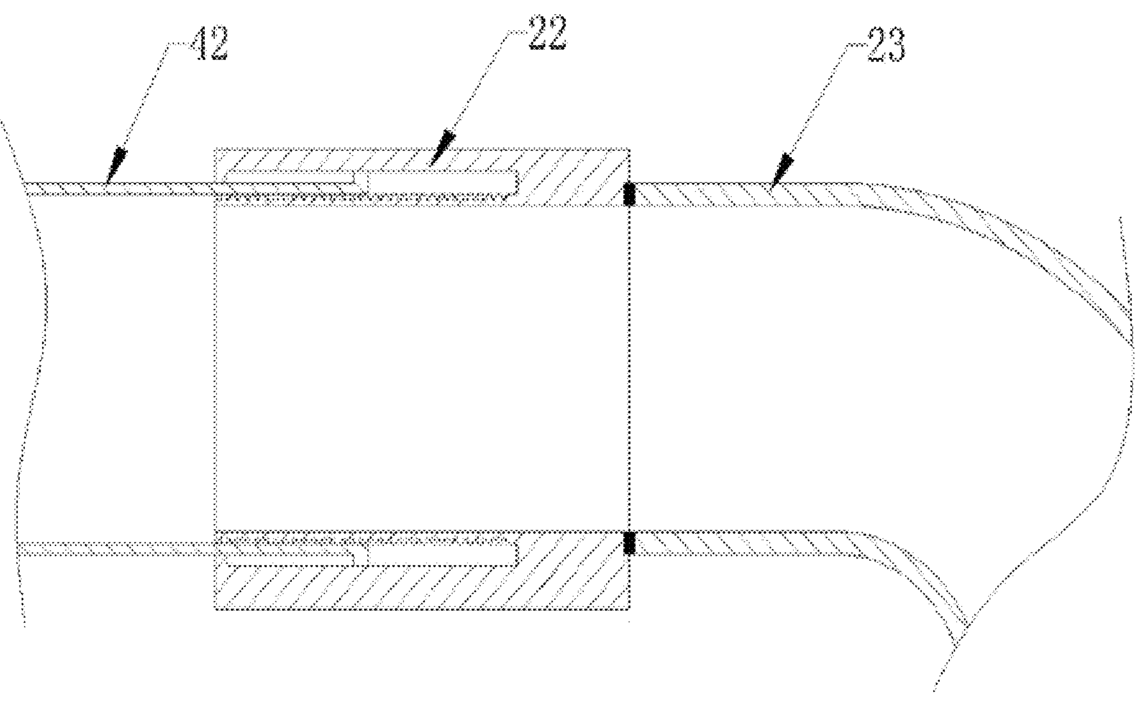
FIG. 9 is a sectional view of a pipe telescoping device according to some embodiments of the present disclosure.

FIG. 9 is a sectional view of a pipe telescoping device according to some embodiments of the present disclosure.

In some embodiments, as shown in FIGS. 4 and 9, a liquid outlet of the pipe telescoping device 22 may be connected to a liquid inlet of the main outflow pipe 23 through various connection manners, such as riveting, welding, etc. In some embodiments, a liquid outlet of the main outflow pipe 23 may be connected to the water tank 1, and a liquid inlet of the main flow pump 5 may be connected to the water tank 1 through the main flow inlet pipe 2, thus, water circulation is achieved in an entire test system.

In some embodiments, the drag testing apparatus may also include the movable pipe 42. A liquid outlet of the movable pipe 42 may be connected to a liquid inlet of the pipe telescoping device 22, and a liquid inlet of the movable pipe 42 may be connected to the liquid outlet of the biomimetic circular test hose 9. When a curvature of the biomimetic circular test hose 9 changes, the movable pipe 42 is driven to move along an axial direction.

In some embodiments, the pipe telescoping device 22 may be provided with a stepped sealing structure in a regular geometric shape. The stepped sealing structure may be a rectangular groove structure along a vertical direction. During a contact process between the movable pipe 42 and the pipe telescoping device, a series of regular throttling gaps and expansion chambers may be formed, and a step-by-step throttling effect may be generated through viscosity friction of a medium and conversion of energy, such that the movable pipe 42 may be configured to move along the axial direction within the telescopic pipe device 22 when a sealed condition is ensured.

In some embodiments, a limit member may be provided on the movable pipe 42 to prevent separation between the movable pipe 42 and the pipe telescoping device 22 during the movement along the axial direction.

Figure 10:
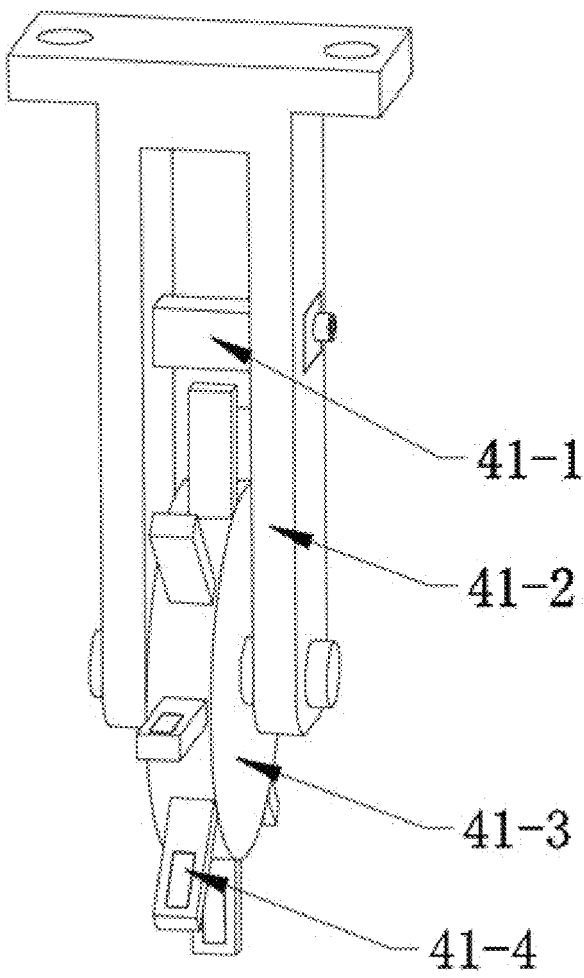
FIG. 10 is a schematic diagram of a structure of a drag testing device according to some embodiments of the present disclosure.

FIG. 10 is a schematic diagram of a structure of a drag testing device according to some embodiments of the present disclosure.

In some embodiments, as shown in FIG. 10, the drag testing device 41 includes a Hall sensor 41-1, a turntable bracket 41-2, a turntable 41-3, and a plurality of magnets 41-4. In some embodiments, the Hall sensor 41-1 may be installed on the turntable bracket 41-2 and above the turntable 41-3. The turntable 41-3 may be fixed on the turntable bracket 41-2 through a rotating shaft. The plurality of magnets 41-4 may be interference-fitted into a plurality of grooves of each blade of the turntable 41-3. In some embodiments, the turntable 41-3 may include eight blades, such that interference fitting of eight of the plurality of magnets 41-4 is required. In some embodiments, two drag testing devices 41 are installed at the liquid inlet and the liquid outlet of the biomimetic circular test hose 9, respectively. When water flows into the biomimetic circular test hose 9, the flow of water may drive the turntable 41-3 in the drag testing device 41 to rotate. The eight of the plurality of magnets 41-1 on the eight blades of the turntable 41-3 may periodically approach and move away from the Hall sensor 41-1. Each time any one of the eight of the plurality of magnets 41-1 approaches the Hall sensor 41-1, the Hall sensor 41-1 receives a high-level signal.

In some embodiments, each of the first fixed segment 10, the first trapezoidal segment 13, the first parallelogram segment 14, the first inverted trapezoidal segment 15, the second inverted trapezoidal segment 16, the third inverted trapezoidal segment 17, the second parallelogram segment 18, the second trapezoidal segment 19, and the first end segment 21 may be a tubular structure.

Figure 11:
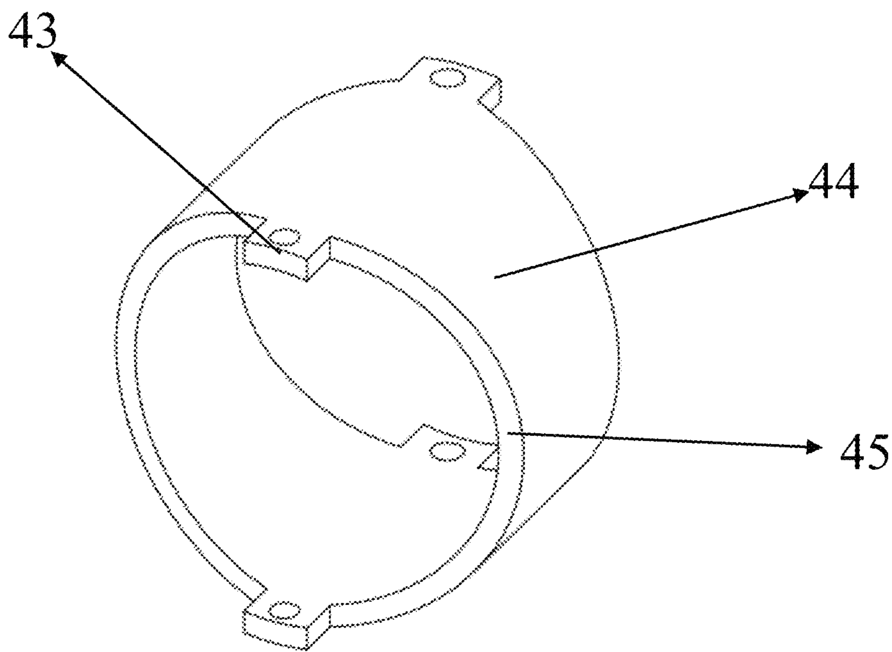
FIG. 11 is a three-dimensional schematic diagram of a tubular structure according to some embodiments of the present disclosure.

FIG. 11 is a three-dimensional schematic diagram of a tubular structure according to some embodiments of the present disclosure.

In some embodiments, as shown in FIG. 11, the tubular structure includes a tubular body 43, a plurality of hinge members 44, and a plurality of incision grooves 45. The plurality of hinge members 44 may protrude axially at two ends of the tubular body 43, and the plurality of incision grooves 45 may be formed in a space between two of the plurality of hinge members 44 at a same end of the tubular body 43 in a circumferential direction. A count of the plurality of incision grooves 45 may be equal to a count of the plurality of hinge members 44.

The tubular body is a structural body for arranging the plurality of hinge members and the plurality of incision grooves. In some embodiments, the tubular body may include two circular end surfaces, and a circular end face refer to a circular surface of the two ends of the tubular body.

The plurality of hinge members are connecting members configured to connect two tubular structures. In some embodiments, a hinge member may include but is not limited to a hinge joint, a pin shaft, a rotating joint, etc.

The plurality of incision grooves may be configured to provide a rotational space (i.e., a rotational angle) for the two tubular structures. In some embodiments, an incision groove on the tubular structure may be an arc-shaped groove. When another tubular structure connected to a tubular structure rotates, the another connected tubular structure may undergo a certain angle of deflection toward an incision groove along a rotation center of a hinge member, providing a rotational space for the tubular structure.

In some embodiments, each of two ends of the tubular structure may include two hinge members and two incision grooves. The two hinge members may be configured to symmetrically protrude from the circular end surfaces at the two ends of the tubular body. In this case, arc lengths of the two incision grooves on the circular end surfaces are equal.

In some embodiments, the tubular structure of the drag testing device may also include a driving device. The driving device may be configured to drive the tubular structure to rotate at a certain angle, and a driving direction of the driving device may be perpendicular to an axis of the tubular structure. In some embodiments, the driving device may include a cylinder, a linear actuator, and a servo drive.

In some embodiments, two ends of each tubular structure may be respectively provided with the driving device. The driving device may be used to push the two ends of the each tubular structure to move in a same direction or an opposite direction for different distances, thereby causing the each tubular structure to undergo a corresponding angle of deflection.

In some embodiments, by installing the driving device on each tubular structure, rotation of the each tubular structure may be achieved without the need for the plurality of IPMC telescopic plates 12. The driving device may be used to push each tubular structure to move a different distance, precisely controlling the angle of deflection of the each tubular structure.

Since the biomimetic circular test hose 9 is fixed within a plurality of interconnected tubular structures, each of a plurality of interconnected tubular structures (i.e., the first fixed segment 10, the first trapezoidal segment 13, the first parallelogram segment 14, the first inverted trapezoidal segment 15, the second inverted trapezoidal segment 16, the third inverted trapezoidal segment 17, the second parallelogram segment 18, the second trapezoidal segment 19, and the first end segment 21) may be cut from a metal pipe with an inner diameter larger than a diameter of the biomimetic circular test hose 9. In some embodiments of the present disclosure, compared to fixing the biomimetic circular test hose 9 in the plurality of interconnected tubular structures by opening a circular through-hole in a middle of each of the plurality of interconnected tubular structures, directly fixing the biomimetic circular test hose 9 in the plurality of interconnected tubular structures cut from the metal pipe can effectively reduce the processing difficulty and reduce material loss during processing.

In some embodiments, the count of the plurality of hinge members and the count of the plurality of incision grooves in the tubular structure may be not less than three, and adjacent tubular structures may be connected by a plurality of corresponding hinge members through a misaligned connection.

A misaligned connection refers to a manner that two hinge members are connected through misalignment. For example, circular end surfaces of the first trapezoidal segment 13, the first fixed segment 10, and the first parallelogram segment 14 where the first trapezoidal segment 13, the first fixed segment 10, and the first parallelogram segment 14 are connected may be provided with three hinge members respectively, and the three hinge members are evenly distributed along a circumference. Any two of the three hinge members may form an angle of 120° with a line connecting centers of two of the circular end surfaces. For illustrative purposes, the three hinge members are referred to as a first hinge member, a second hinge member, and a third hinge member. The first trapezoidal segment 13 and the first fixed segment 10 may be connected by the first hinge member and the second hinge member. In this case, a deflected first central axis is a line connecting centers of the first hinge member and the second hinge member. The first trapezoidal segment 13 and the first parallelogram segment 14 may be connected by the second hinge member and the third hinge member. In this case, a deflected second central axis is a line connecting centers of the second hinge member and the third hinge member. Due to the even distribution of the three articulated components at intervals of 120° around the circumference, the deflected first central axis and the deflected second central axis are not parallel to an axis of the first trapezoidal segment 13 (or an axis of the first fixed segment 10), and an angle between the first central axis and the second central axis is 60°.

In some embodiments, each of the circular end surface of the tubular body may be provided with four hinge members and four incision grooves, which may be evenly distributed along the circumference of the circular end surface. The four hinge members may be evenly spaced at 90° intervals on the circular end surface, which are referred to as an upper hinge member, a lower hinge member, a left hinge member, and a right hinge member. Adjacent tubular structures may be connected by corresponding four hinge members through an interlocked connection.

An interlocked connection refers to a manner of connection where each tubular structure is vertically connected through the upper hinge member and the lower hinge member of the each tubular structure, and the left hinge member and the right hinge member of the each tubular structure are respectively connected to adjacent tubular structures. For example, the first fixed segment 10 and the first trapezoidal segment 13 may be hinged left and right by the left hinge member and the right hinge member, the first trapezoidal segment 13 and the first parallelogram segment 14 may be hinged up and down by the upper hinge member and the lower hinge member, and the first parallelogram segment 14 and the first inverted trapezoidal segment 15 may be hinged left and right by the left hinge member and the right hinge member, such that the first trapezoidal segment 13 may be bent left and right relative to the first fixed segment 10, the first parallelogram segment 14 may be bent upward and downward relative to the first trapezoidal segment 13, and the first inverted trapezoidal segment 15 may be bent left and right relative to the first parallelogram segment 14.

In some embodiments, a plurality of tubular structures (i.e., the first fixed segment 10, the first trapezoidal segment 13, the first parallelogram segment 14, the first inverted trapezoidal segment 15, the second inverted trapezoidal segment 16, the third inverted trapezoidal segment 17, the second parallelogram segment 18, the second trapezoidal segment 19, and the first end segment 21) cut from a metal circular pipe may be interconnected using the interlocked connection through the plurality of hinge members, allowing the plurality of tubular structures to be bent in a three-dimensional space (e.g., achieving upward and downward bending as well as left and right bending). By setting the count of the plurality of hinge members to four and performing the up-and-down and left-and-right hinging in the interlocked connection in sequence, a rotation axis may be perpendicular to the axis of each of the plurality of tubular structures. Compared to the misaligned connection, the interlocked connection makes it easier to determine a deflection angle, reducing the operational complexity of the driving device in determining a movement distance of each of the plurality of tubular structures.

In some embodiments, adjacent segments of the plurality of tubular structures may be connected by a plurality of corresponding hinge members in the interlocked connection manner, allowing the plurality of tubular structures to be bent in a three-dimensional space. By adjusting the count and positions of the plurality of hinge members, a range of bending for the biomimetic circular test hose 9 may be increased (e.g., from two-dimensional space to three-dimensional space), enabling a main flow field to have the capability to test three-dimensional spatial curvature.

In some embodiments, a working process of the drag testing apparatus with variable flow field curvature and jet angle may include the follow operations:

In operation 1, a position of the fixed inner ring 36-12 may be adjusted by adjusting the sliding block 36-4 and the threaded rod 36-5 in the multi-directional jet angle adjustment device. Since the liquid outlet at the lower end of the circular through-hole of the fixed inner ring 36-12 is connected to the jet telescopic hose 39 through waterproof sealing glue, a change in the position of the fixed inner ring 36-12 may change the jet angle of the jet telescopic hose 39. By adjusting the sliding block 36-4 and the threaded rod 36-5 to appropriate positions, the jet angle may be adjusted to a target angle.

In operation 2, the control console 37 may be configured to send a voltage signal to the plurality of IPMC telescopic plates 12 via the control signal lines 20. The plurality of IPMC telescopic plates 12 may be configured to contract synchronously based on the voltage signal. The IPMC telescopic plate 12 may be adhered between angles of each two of the plurality of tubular structures through epoxy, allowing the deformation of the plurality of IPMC telescopic plates 12 to drive the entire main flow field curvature adjustment device to change. The plurality of universal wheels 40 may be installed at bottoms of the plurality of tubular structures (i.e., the first fixed segment 10, the first trapezoidal segment 13, the first parallelogram segment 14, the first inverted trapezoidal segment 15, the second inverted trapezoidal segment 16, the third inverted trapezoidal segment 17, the second parallelogram segment 18, the second trapezoidal segment 19, and the first end segment 21) to ensure a smooth movement of each of the plurality of tubular structures during curvature adjustment. Since the biomimetic circular test hose 9 is fixed within the main flow field curvature adjustment device, the biomimetic circular test hose is driven to change curvature synchronously. After the control console 37 sends the voltage signal to adjust the curvature to the target curvature, the curvature of the main flow field is adjusted to the target curvature.

In operation 3, the main flow motor 4 may be started, and a rotation speed of the main flow motor 4 may be adjusted through the main flow frequency converter 3. The main flow motor 4 may drive the main flow pump 5 to operate, pumping water from the water tank 1. The water may pass through the rectifying pipe 8 and may be pumped into the biomimetic circular test hose 9 whose curvature is adjusted. Then, the jet motor 26 may be started, a rotation speed of the jet motor 26 may be adjust through the jet frequency converter 25, and the jet motor 26 may be used to drive the jet pump 27 to operate, pumping the water from the water tank 1 into the jet water tank 28 through the outlet pipe, and the water in the jet water tank 28 enters the biomimetic circular test hose 9 through the jet hole inlets. The main flow velocity and the jet velocity may be controlled by adjusting the main flow electric ball valve 6 and the jet electric ball valve 32, and magnitudes of the main flow and the jet may be displayed through a main flow flowmeter 7 and the jet flowmeter 33.

In operation 4, after a cumulative high-level difference is measured through the two drag testing devices 41 respectively installed at the liquid inlet and the liquid outlet of the biomimetic circular test hose 9, a variable to be tested may be reset. The operations 1-3 may be repeated, and the cumulative high-level difference may be measured once again through the two drag testing devices 41. A drag reduction DR rate may be determined based on the following formula (1):

$$DR = \frac{T1 - t1}{T1} \times 100\% \tag{1}$$

Wherein DR represents the drag reduction rate, T1 represents the cumulative high-level difference initially measured through the two drag testing devices 41 respectively installed at the liquid inlet and the liquid outlet of the biomimetic circular test hose 9, t1 represents the cumulative high-level difference measured subsequently through the two drag testing devices 41.

In some embodiments, the drag reduction effect on a biomimetic jet surface may be evaluated by the drag testing device using the following method.

When it is necessary to determine the drag reduction rate of the biomimetic circular test hose 9 under different curvatures at different main flow velocities, jet velocities, and jet angles, the curvature of the main flow field may be determine firstly. When the jet velocity is determined to be 0 m/s, the jet angle is determined to be 0°, and the main flow velocity is determined to be V, a cumulative count of high-level occurrences N1 for the drag testing device 41 installed at the liquid inlet of the biomimetic circular test hose 9, and a cumulative count of high-level occurrences N2 for the drag testing device 41 installed at the liquid outlet of the biomimetic circular test hose 9, may be obtained. A difference between N1 and N2, i.e., T1=N1−N2, is determined. When a single variable or a plurality of coupled variables are changed, for example, when one or a combination of any two or three of the jet velocity, the jet angle, or the main flow velocity V is changed, cumulative counts n1 and n2 for the drag testing devices 41 installed respectively at the liquid inlet and the liquid outlet of the biomimetic circular test hose 9 may be obtained, and a difference between n1 and n2, i.e., t1=n1−n2, may be used to calculate the drag reduction DR rate using the formula (1). A higher drag reduction DR rate indicates a better drag reduction effect. After the curvature of the main flow field is changed, the operations 1-3 may be repeated to measure the drag reduction effect of different main flow field curvatures under different jet conditions.

In some embodiments of the present disclosure, the drag testing apparatus can easily change the curvature of the main flow field and form multi-directional jets at different angles, allowing for the comparison of optimal drag reduction conditions under different main flow field curvatures and multi-directional jet angles.

In some embodiments of the present disclosure, by fixing the biomimetic circular test hose in the main flow field curvature adjustment device and driving the plurality of IPMC telescopic plates to change the curvature of the main flow field curvature adjustment device, the curvature of the biomimetic circular test hose may be changed, enabling the study of an influence of main flow field curvature on drag reduction.

In some embodiments of the present disclosure, by designing the multi-directional jet angle adjustment device, and adjusting the sliding block and the threaded rod on the multi-directional jet angle adjustment device, jets at different angles may be formed in any direction. Considering an impact of a jet circular through-hole surface on an oblique jet when the jet direction changes, a cylindrical through-hole is transformed into a frustum-shaped through-hole with a smaller diameter at a top and a larger diameter at a bottom, thereby allowing for the study of an influence of multi-directional jets at different angles on jet drag reduction.

In some embodiments of the present disclosure, the drag testing apparatus has a small footprint, low cost, simple structure, and is easy to use. The method for evaluating the drag reduction effect on the biomimetic jet surface using the drag testing apparatus is simple, intuitive, reliable, which can accurately control the jet velocity and the main flow velocity. In addition, the method can simulate different jet environments, which achieves water recycling during the testing process, and is environmentally friendly, energy-efficient, and pollution-free.

In some embodiments, the drag testing apparatus may further include a processor and a display unit. The processor may be configured to record a current completed test case, and in response to completing a test case, update a first set of test cases. The processor may be further configured to determine a second set of test cases based on the first set of test cases, determine at least one recommended test case based on the first set of test cases and the second set of test cases, and display the at least one recommended test case through the display unit.

A test case refers to a test used to determine the cumulative high-level difference of the biomimetic circular test hose 9 under a specific condition (e.g., a specific test parameter). In some embodiments, the test case may include a test parameter. The test parameter may include the curvature of the main flow field, the jet velocity, the jet angle, and the main flow velocity. In some embodiments, the drag testing device 41 may determine the cumulative high-level difference corresponding to the biomimetic circular test hose 9 under the condition of the test parameter.

For example, a test case may involve the drag testing device 41 determining the cumulative high-level difference of the biomimetic circular test hose 9 when the curvature of the main flow field is determined to be a0, the jet velocity is determined to be b0, the jet angle is determined to be c0, and the main flow velocity is determined to be d0.

More details regarding the curvature of the main flow field, the jet velocity, the jet angle, the main flow velocity, and the cumulative high-level difference may be found in the previous related descriptions.

In some embodiments, the processor may generate the test parameter for the test case in various ways. For instance, the processor may randomly combine a historical curvature of the main flow field, a historical jet velocity, a historical jet angle, and a historical main flow velocity from historical test parameters to generate a currently required test parameter for the test case. If the cumulative high-level difference of the biomimetic circular test hose 9 under the currently required test parameter is determined through testing, i.e., the test case is completed, then the processor may categorize the test case as a test case in the first set of test cases. If the cumulative high-level difference of the biomimetic circular test hose 9 under the currently required test parameter is not determined, i.e., the test case is not completed, then the processor may categorize the test case as a test case in the second set of test cases.

A first set of test cases refers to a collection of completed test cases. In some embodiments, in response to completing a test on the test parameter, the processor may obtain a test result (i.e., the cumulative high-level difference) of the test case corresponding to the test parameter and add the test case to the first set of test cases. In some embodiments, the processor may determine the cumulative high-level difference through the drag testing device 41. More details about the determination of the cumulative high-level difference may be found in the previous related descriptions.

For example, the processor may designate a first completed test case with an obtained cumulative high-level difference as an initial first set of test cases. When a second test case is completed, and the processor may obtain the corresponding cumulative high-level difference T1, the processor may add the second test case to the initial first set of test cases, resulting in an updated first set of test cases. The first set of test cases may be iteratively updated in this manner.

A second set of test cases refers to a collection of test cases that are not yet tested. In some embodiments, the processor may designate a test case whose test parameter is not yet tested as the second set of test cases. In some embodiments, the second set of test cases may include a test case with a test parameter and a test result equal to 0. A test case with a test result of 0 indicates that the test case in the second set of test cases is not yet tested.

A recommended test case refers to a test case in the second set of test cases having a testing value.

In some embodiments, the processor may determine the at least one recommended test case based on the first set of test cases and the second set of test cases through the following operations S1 and S2.

In S1, a distance between each test case in the second set of test cases and the first set of test cases may be determined. For example, for a test case A in the second set of test cases, a distance between the test case A and the first set of test cases may be determined using the following formula (2).

$$S_A = \frac{Q1 + Q2 + \ldots Qn}{n} (2) \quad (2)$$

Wherein $S_A$ represents the distance between the test case A and the first set of test cases, Q1 represents a first degree of difference between the test case A and a first test case in the first set of test cases, Q2 represents a first degree of difference between the test case A and a second test case in the first set of test cases, Qn represents a first degree of difference between the test case A and a n-th test case in the first set of test cases, and n represents a count of test cases in the first set of test cases.

A first degree of difference refers to a difference between test parameters of two test cases. For example, if the test parameters of the test case A are (a1, b1, c1, d1), and the test parameters of the first test case in the first set are (a2, b2, c2, d2), the processor may determine the first degree of difference Q1 between the test case A and the first test case in the first set of test cases using the following formula (3):

$$Q1=(a1-a2)^2+(b1-b2)^2+(c1-c2)^2+(d1-d2)^2 \quad (3)$$

Wherein a1 and a2 denote the curvatures of the main flow field, b1 and b2 denote the jet velocities, c1 and c2 denote the jet angles, and d1 and d2 denote the main flow velocities. Similarly, the processor may determine the first degree of difference between the test parameters of each test case in the second set of test cases and the test parameters of each test case in the first set of cases.

In S2, a test case in the second set of test cases may be categorized as the at least one recommended test case in response to a determination that the distance between the test case in the second set of test cases and the first set of test cases exceeds a preset distance threshold. For example, if the second set of test cases includes test cases A, B, C, and D, whose distances to the first set of test cases are 5, 13, 18, and 17, respectively, and the preset distance threshold is 12, then test cases B, C, and D may be determined as the at least one recommended test case. The preset distance threshold may be determined in advance by personnel or the processor based on historical experience.

In some embodiments, the processor may determine the at least one recommended test case through a predictive model. More details about the determination of the at least one recommended test case through the predictive model may be found in the following related descriptions.

A display unit is a device configured to display the at least one recommended test case. For example, the display unit may be a light emitting diode (LED) screen. In some embodiments, the processor may display the at least one recommended test case on the display unit in various ways. For example, the at least one recommended test case may be displayed in a graphic form or a tabular form on the display unit.

The count of the test cases is typically large, and testing different test cases to determine the cumulative high-level difference of the biomimetic circular test hose 9 incurs significant costs. Therefore, in some embodiments, a plurality of recommended test cases determined from the first set of test cases and the second set of test cases exhibit a more uniform distribution of test parameters, which allows for a comprehensive determination of the cumulative high-level difference of the biomimetic circular test hose 9 under different curvatures, main flow velocities, jet velocities, and jet angles. Thus, the recommended test cases identified among a plurality of different test cases are more valuable, effectively reducing the cost of testing a large count of test cases.

In some embodiments, the processor may determine a preset count threshold based on a sensitivity of the drag testing apparatus. Based on the first set of test cases, the second set of test cases, and the preset count threshold, the processor may determine the plurality of recommended test cases, and a count of recommended test cases may not exceed the preset count threshold. The plurality of recommended test cases may be displayed through the display unit. In some embodiments, the processor may adjust a performance quota for a testing recording task and a testing scheduling task based on the sensitivity of the drag testing apparatus.

The sensitivity of the drag testing apparatus is related to a rotational speed at which the turntable in the drag testing device is driven by a flow of water. For example, when flows of water at a same flow rate enter into the biomimetic circular test hose 9, the higher the rotational speed at which water drives the turntable in the drag testing device to rotate is, the greater the sensitivity of the drag testing apparatus may be. More details about the turntable may be found in the previous related descriptions.

The preset count threshold is a parameter used to limit the count of recommended test cases. In some embodiments, the greater the sensitivity of the drag testing apparatus is, the larger the preset count threshold may be. A ratio of the sensitivity of the drag testing apparatus to the preset count threshold may be a preset value, which may be determined in advance by personnel or the processor based on historical experience.

In some embodiments, in response to determining that the count of determined recommended test cases exceeds the preset count threshold, the processor may randomly remove at least one recommended test case to ensure that the count of the recommended test cases does not exceed the preset count threshold.

A testing recording task refers to a task related to data recording that the processor performs. In some embodiments, the testing recording task performed by the processor may include a task such as receiving sensor data (i.e., a high-level signal) generated by the drag testing apparatus and recording the completed test cases. More details about the high-level signal may be found in the previous related descriptions.

A testing scheduling task refers to a task performed by the processor when determining the recommended test cases. More details about determining the recommended test cases may be found in the previous related descriptions.

A performance quota refers to the processor's capability to execute the testing recording task and the testing scheduling task.

In some embodiments, the higher the sensitivity of the drag testing apparatus is, the higher the performance quota that the processor may allocate for the testing recording task may be.

In some embodiments, the processor may adjust the performance quota for the testing recording task and the testing scheduling task in various ways. For example, the processor's affinity for a relevant process and a relevant thread may be set via a computer to allocate the performance quota. The relevant process may include a process associated with the testing recording task and the testing scheduling task, while the relevant thread may include a thread associated with the testing recording task and the testing scheduling task. The higher the affinity of the relevant process (i.e., the process associated with testing recording task or the testing scheduling task) with the processor is, the less likely the relevant process is to be migrated out of the processor, and thus may run on the processor for an extended period.

In some embodiments, accurately determining and configuring the required performance quota for the processor to execute the testing recording task and the testing scheduling task may be achieved by determining the sensitivity of the drag testing apparatus, thereby preventing inadequate performance due to the processor's computational resources occupied by other tasks (e.g., the testing scheduling task) during the execution of the testing recording task, which may lead to abnormal situations.

A sensitivity of the drag testing apparatus is an objective indicator that reflects the efficiency of the Hall sensor in receiving a high-level signal. The higher the sensitivity of the drag testing apparatus is, the less time it takes to complete a test case. In some embodiments, balancing the comprehensiveness and cost of testing may be achieved by determining a maximum count of recommended test cases (i.e., the preset count threshold) that still need to be tested based on the sensitivity of the drag testing apparatus.

In some embodiments, the processor may use a predictive model to determine an estimated cumulative high-level difference for each test case in the second set of test cases. Based on the estimated cumulative high-level differences for the each test case in the second set of test cases, at least one recommended test case may be determined.

A predictive model may be a machine learning model configured to determine the estimated cumulative high-level difference for the each test case in the second set. In some embodiments, the predictive model may be one or a combination of a Recurrent Neural Network (RNN) model, a Long Short-Term Memory Network (LSTM) model, or any another custom model structure.

In some embodiments, an input of the predictive model may include test parameters and corresponding test result for each test case in the first set of test cases, and test parameters for a specific test case in the second set of cases. An output of the predictive model may include an estimated test result (i.e., an estimated cumulative high-level difference) for the specific test case.

In some embodiments, the predictive model may be trained using a large count of first training samples with first labels through various manners. For example, the training may be performed based on gradient descent. Merely by way of example, a plurality of first training samples with first labels may be input into an initial predictive model. A loss function may be constructed based on the plurality of first labels and a result of the initial predictive model. A parameter of the initial predictive model may be iteratively updated based on the loss function through iterations. The training is completed when the loss function of the initial predictive model meets a preset iteration condition, such as convergence of the loss function or a count of the iterations reaching a threshold.

In some embodiments, the plurality of first training samples may include the test parameters and the corresponding test result for the each test case in the first set of test cases, and the test parameters for a specific test case in the second set of test cases. A first training sample may be constructed based on historical data. A first label corresponds to an actual measured cumulative high-level difference for a specific test case in the second set of test cases. The first label may be manually annotated.

An estimated cumulative high-level difference refers to an estimated parameter used to determine the at least one recommended test case.

In some embodiments, the processor may determine the at least one recommended test case by identifying a test case in the second set of test cases with an estimated cumulative high-level difference greater than a preset difference threshold. The preset difference threshold may be determined by personnel or the processor based on historical experience.

In some embodiments, the processor may randomly select two different test cases from the second set of test cases, determine the first degree of difference and a second degree of difference between the two test cases. If the first degree of difference is less than a first preset threshold and the second degree of difference is greater than a second preset threshold, the two test cases are determined as the at least one recommended test case. More details of the first degree of difference may be found in the previous description, and a second degree of difference refers to a degree of difference between the estimated test results of the two test cases. For example, the greater the difference between the estimated cumulative high-level differences corresponding to the two test cases is, the larger the second degree of difference may be. The first preset threshold and the second preset threshold may be determined in advance by personnel or the processor based on historical experience.

In some embodiments, the processor may repeat the process of randomly selecting two different test cases from the second set of test cases and determining whether the two test cases are the at least one recommended test cases a plurality of times. A count of the repetitions may be determined in advance by personnel or the processor based on historical experience, and a count of the at least one recommended test case obtained may not exceed the preset count threshold.

In some embodiments, the predictive model may be used to efficiently analyze the test parameters and the corresponding test result for the each test case in the first set of test cases, and the test parameters for a specific test case in the second set of test cases, thereby improving the speed and accuracy of determining the estimated cumulative high-level difference, making the at least one recommended test case determined based on the estimated cumulative high-level difference have higher testing value and lower testing cost.

In some embodiments, the processor may, based on the test parameters and an actual test result (i.e., actual cumulative high-level difference) for each test case in the first set of test cases, generate at least one fitting curve. The processor may determine an estimated deviation distance for the each test case in the second set of test cases, and based on the estimated deviation distance, determine the at least one recommended test case.

A fitting curve is a function curve used for determining the at least one recommended test case. In some embodiments, the processor may generate the at least one fitting curve using various fitting techniques, such as a least square technique, a partial least squares regression (PLS) technique, etc.

A functional relationship between the test parameters and the actual test result is uncertain, which indicates that whether the relationship between test parameters and the actual test result is linear or nonlinear may not be predetermined. Therefore, in some embodiments, the at least one fitting curve generated by the processor may include at least one of a linear regression fitting line or a nonlinear regression fitting curve.

An estimated deviation distance refers to an average distance between the test cases in the second set of test cases and a plurality of fitting curves. For example, for a test case (x, y) in the second set of test cases, wherein x represents a test parameter of the test case, and y represents the estimated cumulative high-level difference, the plurality of fitting curves include $f_1(x)$, $f_2(x)$, etc. The processor may determine a shortest distance between the test case (x, y) and each of the plurality of fitting curves $f_1(x)$, $f_2(x)$, etc., and determine an average of a plurality of obtained shortest distances as the estimated deviation distance.

In some embodiments, the processor may determine the at least one recommended test case by determining a test case in the second set of test cases with an estimated deviation distance greater than a preset distance threshold. The preset distance threshold may be determined in advance by personnel or the processor based on historical experience. In some embodiments, a count of the at least one recommended test case determined based on the estimated deviation distance may not exceed the preset count threshold.

In some embodiments, the efficient and rapid identification of the at least one recommended test case with testing value from the second set of test cases may be achieved through the estimated deviation distance between the test cases and the at least one fitting curve.

The basic concepts have been described above, and it is apparent that to a person skilled in the art, the above detailed disclosure is intended as an example only and does not constitute a limitation of the present disclosure. Although not expressly stated herein, various modifications, improvements, and amendments may be made to the present disclosure by those skilled in the art. Such modifications, improvements, and amendments are suggested in the present disclosure, so such modifications, improvements, and amendments remain within the spirit and scope of the exemplary embodiments of the present disclosure.

Also, the present disclosure uses specific words to describe the embodiments of the present disclosure. For example, "an embodiment," "one embodiment," and/or "some embodiments" are meant to refer to a certain feature, structure, or characteristic associated with at least one embodiment of the present disclosure. Accordingly, it should be emphasized and noted that "an embodiment" or "one embodiment" or "an alternative embodiment" mentioned two or more times in different places in the present disclosure do not necessarily refer to the same embodiment. Furthermore, certain features, structures, or characteristics in one or more embodiments of the present disclosure may be suitably combined.

Furthermore, unless explicitly stated in the claims, the use of order, numbers, letters, or other names for processing elements and sequences is not intended to limit the order of the processes and methods of the present disclosure. While various examples have been discussed in the disclosure as currently considered useful embodiments of the invention, it should be understood that such details are provided for illustrative purposes only. The appended claims are not limited to the disclosed embodiments, and instead, the claims are intended to cover all modifications and equivalent combinations within the scope and essence of the embodiments disclosed in the present disclosure. For example, although the described system components may be implemented through a hardware device, they may also be realized solely through a software solution, such as installing the described system on an existing processing or mobile device.

Similarly, it should be noted that, for the sake of simplifying the presentation of embodiments disclosed in the present disclosure and aiding in understanding one or more embodiments of the present disclosure, various features have been sometimes combined into a single embodiment, drawing, or description. However, this manner of disclosure does not imply that the features required by the claims are more than the features mentioned in the claims. In fact, the features of the embodiments are less than all the features of the single embodiment disclosed in the foregoing disclosure.

In some embodiments, numeric values describing the composition and quantity of attributes are used in the description. It should be understood that such numeric values used for describing embodiments may be modified with qualifying terms such as "about," "approximately" or "generally". Unless otherwise stated, "about," "approximately" or "generally" indicates that a variation of ±20% is permitted in the described numbers. Accordingly, in some embodiments, the numerical parameters used in the disclosure and claims are approximations, which may change depending on the desired characteristics of the individual embodiment. In some embodiments, the numerical parameters should take into account a specified number of valid digits and employ a general manner of bit retention. Although the numerical ranges and parameters used in some embodiments of the present disclosure to confirm the breadth of the range are approximations, in specific embodiments, such numerical values are set as precisely as practicable.

With respect to each of the patents, patent applications, publications of patent applications, and other material, such as articles, books, specifications, publications, documents and the like, cited in the present disclosure, the entire contents thereof are hereby incorporated herein by reference. Application history documents that are inconsistent with the contents of the present disclosure or that create conflicts are excluded, as are documents (currently or hereafter appended to the present disclosure) that limit the broadest scope of the claims of the present disclosure. It should be noted that in the event of any inconsistency or conflict between the descriptions, definitions, and/or use of terminology in the materials appended to the present disclosure and the contents described herein, the descriptions, definitions, and/or use of terminology in the present disclosure shall prevail.

In closing, it should be understood that the embodiments described in the present disclosure are used only to illustrate the principles of the embodiments of the present disclosure. Other deformations may also fall within the scope of the present disclosure. Therefore, by way of example and not limitation, alternative configurations of the embodiments disclosed in the present disclosure may be considered consistent with the teachings of the present disclosure. Accordingly, the embodiments described in the present disclosure are not limited to the explicitly introduced and described embodiments in the present disclosure.

What is claimed is:

1. A drag testing apparatus with variable flow field curvature and jet angle, comprising:

a main flow field supply device, a main flow field flow control device, a biomimetic circular test hose, a main flow field curvature adjustment device, a jet supply device, a jet flow control device, a multi-directional jet angle adjustment device, a pipe telescoping device, and a drag testing device, wherein a liquid outlet of the main flow field supply device is connected to a liquid inlet of the main flow field flow control device, a liquid outlet of the main flow field flow control device is connected to a liquid inlet of the biomimetic circular test hose, a liquid outlet of the biomimetic circular test hose is connected to a liquid inlet of the pipe telescoping device, and a liquid outlet of the pipe telescoping device is connected to a water tank;

the biomimetic circular test hose is provided inside the main flow field curvature adjustment device;

a liquid outlet of the jet supply device is connected to a liquid inlet of the jet flow control device, a liquid outlet of the jet flow control device is connected to a liquid inlet of the multi-directional jet angle adjustment device, a liquid outlet of the multi-directional jet angle adjustment device is connected to one or more jet hole inlets on the biomimetic circular test hose, and the multi-directional jet angle adjustment device is installed on the main flow field curvature adjustment device;

the liquid inlet and the liquid outlet of an inner wall of the biomimetic circular test hose are provided with the drag testing device, respectively;

the multi-directional jet angle adjustment device comprises a plurality of springs, a plurality of suspension rings, an upper cover plate, a sliding block, a threaded rod, a sliding block press plate, a threaded rod press plate, an internal threaded block, a base, a rotating outer ring, a conical roller bearing, and a fixed inner ring, wherein a bottom circular convex platform of the base is connected to the main flow field curvature adjustment device, the sliding block press plate, when assembled with the base, forms a sliding groove, the sliding block is installed in the sliding groove and is configured to slide along a circumferential direction, a center of the sliding block is provided with a threaded through-hole, the threaded rod is installed in the threaded through-hole of the sliding block through a threaded connection and is configured to move along an axial direction by rotating the threaded rod;

an outer convex platform of the rotating outer ring is provided with a blind hole, a top of the threaded rod is connected to the internal threaded block, the internal threaded block is connected to the blind hole through the threaded rod press plate, a stepped hole is provided inside the rotating outer ring, an outer side of the conical roller bearing is assembled with an upper end hole of the rotating outer ring, and the fixed inner ring is in a stepped shaft shape with two sections, and a circular through-hole is provided inside the fixed inner ring;

a lower end shaft of the fixed inner ring is assembled with an inner hole of the conical roller bearing to ensure that the fixed inner ring remains stationary when the rotating outer ring rotates through the conical roller bearing;

a liquid inlet at an upper end of the circular through-hole of the fixed inner ring is adhesively connected to the telescopic hose through waterproof sealing glue, and a liquid outlet at a lower end of the circular through-hole of the fixed inner ring is adhesively connected to a jet telescopic hose through the waterproof sealing glue;

an outer convex platform of the fixed inner ring is provided with a plurality of threaded holes, four of the plurality of suspension rings are connected to the fixed inner ring through the plurality of threaded holes on the outer convex platform of the fixed inner ring, and the four of the plurality of suspension rings are installed on the fixed inner ring in a circular arrangement at intervals of 90°;

an inner convex platform of the upper cover plate is also provided with a plurality of threaded holes, another four of the plurality of suspension rings are connected to the upper cover plate through the plurality of threaded holes on the inner convex platform of the upper cover plate, and the another four of the plurality of suspension rings are installed on the upper cover plate in a circular arrangement at intervals of 90°;

the plurality of springs are configured to connect the upper cover plate and the fixed inner ring through the four of the plurality of suspension rings installed on the upper cover plate and the another four of the plurality of suspension rings installed on the fixed inner ring, and the plurality of springs are configured to support the fixed inner ring;

the base is connected to the upper cover plate;

a position of the fixed inner ring is changed by a sliding of the sliding block in the sliding groove along the circumferential direction and a movement of the threaded rod along the axial direction adjusted by a rotation of the threaded rod, such that the jet angle of the jet telescopic hose is changed; and different jet angles are formed in any direction through mutual coordination between the sliding block and the threaded rod.

2. The drag testing apparatus according to claim 1, wherein the main flow field curvature adjustment device comprises a first fixed segment, a first trapezoidal segment, a first parallelogram segment, a first inverted trapezoidal segment, a second inverted trapezoidal segment, a third inverted trapezoidal segment, a second parallelogram segment, a second trapezoidal segment, a first end segment, and a plurality of ion-exchange polymer metal composite (IPMC) telescopic plates, wherein a lower end of the first fixed segment is fixed on a platform, an upper right corner of the first fixed segment is hingedly connected to an upper left corner of the first trapezoidal segment, an upper right corner of the first trapezoidal segment is hingedly connected to an upper left corner of the first parallelogram segment, a lower right corner of the first parallelogram segment is hingedly connected to a lower left corner of the first inverted trapezoidal segment, a lower right corner of the first inverted trapezoidal segment is hingedly connected to a lower left corner of the second inverted trapezoidal segment, a lower right corner of the second inverted trapezoidal segment is hingedly connected to a lower left corner of the third inverted trapezoidal segment, a lower right corner of the third inverted trapezoidal segment is hingedly connected to a lower left corner of the second parallelogram segment, an upper right corner of the second parallelogram segment is hingedly connected to an upper left corner of the second trapezoidal segment, and an upper right corner of the second trapezoidal segment is hingedly connected to the upper left corner of the first end segment to be ultimately connected in a shape similar to a "spine"; and a relative rotation between each two segments is ensured through the hinged connections, a certain angle exists between the each two segments, a center of each segment is provided with a circular through hole, and the biomimetic circular test hose is securely fixed through the circular through-hole of the each segment.

3. The drag testing apparatus according to claim 2, wherein each of the plurality of IPMC telescopic plates is connected to a control signal line, and all control signal lines are configured to be connected to a control console;

the control console is configured to send a voltage signal to the plurality of IPMC telescopic plates through the control signal lines, the plurality of IPMC telescopic plates are configured to undergo synchronized displacement deformation based on the voltage signal, such that the entire main flow field curvature adjustment device is driven to change, the biomimetic circular test hose is fixed within the main flow field curvature adjustment device, such that the biomimetic circular test hose is driven to be bent synchronously, and variation in curvature of the main flow field is achieved based on a strength of the voltage signal emitted by the control console.

4. The drag testing apparatus according to claim 2, further comprising a plurality of universal wheels, wherein the plurality of universal wheel are installed at bottoms of the first fixed segment, the first trapezoidal segment, the first parallelogram segment, the first inverted trapezoidal segment, the second inverted trapezoidal segment, the third inverted trapezoidal segment, the second parallelogram segment, the second trapezoidal segment, and the first end segment to ensure a smooth movement of the each segment.

5. The drag testing apparatus according to claim 1, further comprising a movable pipe, wherein a liquid outlet of the movable pipe is connected to the liquid inlet of the pipe telescoping device, a liquid inlet of the movable pipe is connected to the liquid outlet of the biomimetic circular test hose, and when the curvature of the biomimetic circular test hose changes, the movable pipe is driven to move along an axial direction.

6. The drag testing apparatus according to claim 5, wherein the pipe telescoping device is provided with a stepped sealing structure, the stepped sealing structure is a rectangular groove structure along a vertical direction, during a contact process between the movable pipe and the pipe telescoping device, a series of regular throttling gaps and expansion chambers are formed, and a step-by-step throttling effect is generated through viscosity friction of a medium and conversion of energy, such that the movable pipe is configured to move along the axial direction within the pipe telescoping device when a sealed condition is ensured.

7. The drag testing apparatus according to claim 6, wherein a limit member is provided on the movable pipe to prevent separation between the movable pipe and the pipe telescoping device during the movement along the axial direction.

8. The drag testing apparatus according to claim 1, wherein the drag testing device comprises a Hall sensor, a turntable bracket, a turntable, and a plurality of magnets, wherein the Hall sensor is installed on the turntable bracket above the turntable, the turntable is fixed on the turntable bracket through a rotating shaft, the plurality of magnets are interference-fitted into a plurality of grooves of each blade of the turntable, and the turntable includes eight blades, such that interference fitting of eight of the plurality of magnets is required; and when water flows into the biomimetic circular test hose, the flow of water drives the turntable in the drag testing device to rotate, the eight of the plurality of magnets on the eight blades of the turntable periodically approach and move away from the Hall sensor, and each time any one of the eight of the plurality of magnets approaches the Hall sensor, the Hall sensor receives a high-level signal.

* * * * *